(12) United States Patent
Jensen

(10) Patent No.: US 9,357,831 B2
(45) Date of Patent: Jun. 7, 2016

(54) HYGIENIC BRUSH HEAD

(71) Applicant: Vikan A/S, Skive (DK)

(72) Inventor: Lasse Jensen, Horsens (DK)

(73) Assignee: Vikan A/S, Skive (DK)

( * ) Notice: Subject to any disclaimer, the term of this patent is extended or adjusted under 35 U.S.C. 154(b) by 0 days.

(21) Appl. No.: 14/380,214

(22) PCT Filed: Feb. 22, 2013

(86) PCT No.: PCT/EP2013/053569
§ 371 (c)(1),
(2) Date: Aug. 21, 2014

(87) PCT Pub. No.: WO2013/124422
PCT Pub. Date: Aug. 29, 2013

(65) Prior Publication Data
US 2015/0026905 A1    Jan. 29, 2015

(30) Foreign Application Priority Data

Feb. 24, 2012  (DK) .................................. 201270087
Feb. 24, 2012  (DK) .................................. 201270088

(51) Int. Cl.
*A46B 3/00* (2006.01)
*A46B 3/06* (2006.01)
*A46D 3/00* (2006.01)
*B29C 45/14* (2006.01)
*B29C 45/16* (2006.01)
*A46D 1/00* (2006.01)
*A46D 1/04* (2006.01)

(52) U.S. Cl.
CPC . *A46B 3/005* (2013.01); *A46B 3/06* (2013.01); *A46D 1/0207* (2013.01); *A46D 1/04* (2013.01);

(Continued)

(58) Field of Classification Search
CPC ........ A46B 3/005; A46B 3/06; A46D 1/0207; A46D 1/04; A46D 3/005; B29C 45/14377; B29C 45/14385; B29C 45/1615; B29C 45/1671
See application file for complete search history.

(56) References Cited

U.S. PATENT DOCUMENTS 3,277,510 A    10/1966  Peloquin
3,945,080 A     3/1976  Hamner (Continued)

FOREIGN PATENT DOCUMENTS

DE        581576 C      7/1933
DE      3402606 A1      8/1985

(Continued)

OTHER PUBLICATIONS

International Search Report completed Jun. 24, 2013 for International Application No. PCT/EP2013/053569.

*Primary Examiner* — Shay Karls
(74) *Attorney, Agent, or Firm* — Brinks Gilson & Lione

(57) ABSTRACT

Disclosed is a method of manufacturing a hygienic brush head (210) for cleaning articles, where the brush head (210) comprises a plurality of flexible bristle filaments (200) extending in a longitudinal direction (212) grouped into flexible sweeping elements (202), being encapsulated in a molded bristle carrier (208) connected to a molded brush head body (206), the method comprises: •collecting the flexible bristle filaments (200) in a grouping module creating at least one group of flexible sweeping elements (202), •encapsulating the one end (216) of the at least one group of flexible sweeping elements (202) in a bristle carrier (208) comprising a flange part (222) that extends from the bristle carrier (208) away from the flexible sweeping elements (202), •positioning a plurality of the encapsulated groups of flexible sweeping elements (202) in a mold (214), and performing a first brush head molding of a brush head body (206) around the plurality of the encapsulated groups of flexible sweeping elements (202), •performing a second brush head molding (220) of the brush head body (206) thereby creating a hygienic brush head (210).

18 Claims, 7 Drawing Sheets

(52) U.S. Cl.
CPC .......... *A46D 3/005* (2013.01); *B29C 45/14377* (2013.01); *B29C 45/14385* (2013.01); *B29C 45/1615* (2013.01); *B29C 45/1671* (2013.01); *A46B 2200/302* (2013.01); *B29C 45/14311* (2013.01)

(56) References Cited

U.S. PATENT DOCUMENTS

| | | | |
|---|---|---|---|
| 5,011,230 A * | 4/1991 | Weihrauch | A46B 3/06 300/21 |
| 5,045,267 A | 9/1991 | Weihrauch | |
| 2001/0013152 A1 | 8/2001 | Meyer et al. | |
| 2010/0043165 A1 | 2/2010 | Juentgen et al. | |
| 2011/0258798 A1 | 10/2011 | Naftal | |

FOREIGN PATENT DOCUMENTS

| | | |
|---|---|---|
| DE | 38 32 520 A1 | 4/1990 |
| EP | 0 142 885 A2 | 5/1985 |
| GB | 1911 16204 A | 0/1911 |

* cited by examiner

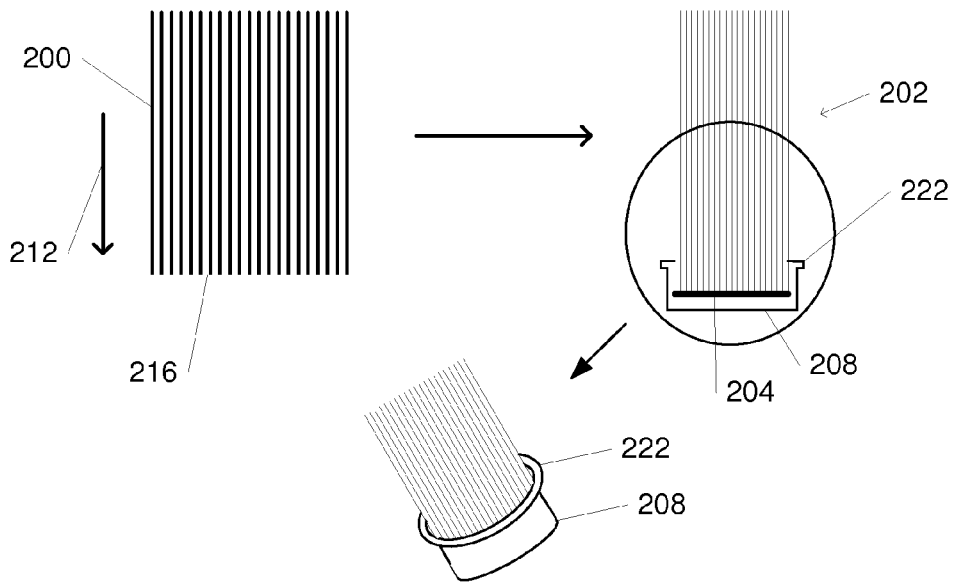
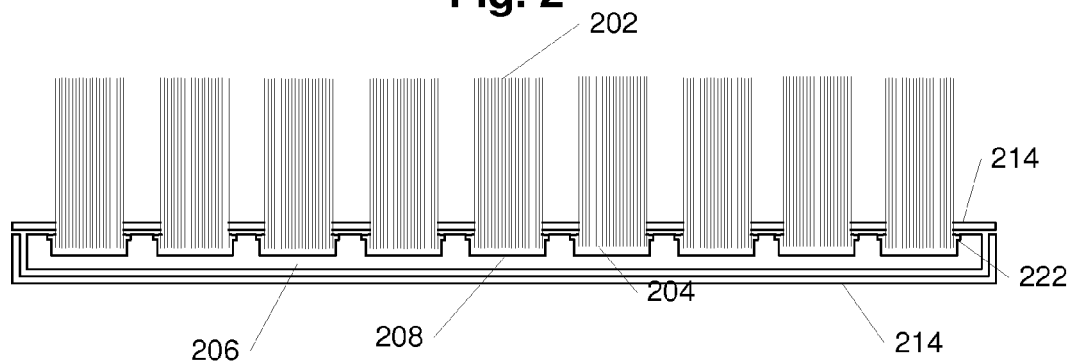
Fig. 3 a
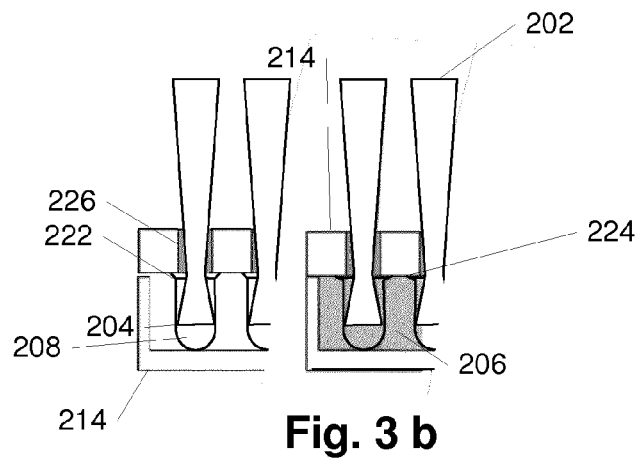
Fig. 3 b

HYGIENIC BRUSH HEAD

This application claims the benefit under 35 U.S.C. §371 of International Application No. PCT/EP2013/053569, filed Feb. 22, 2013, which claims the benefit of Danish Patent Application No. PA201270087, filed Feb. 24, 2012, and Danish Patent Application No. PA201270088, filed Feb. 24, 2012, which are incorporated by reference herein in their entirety.

The present invention relates, according to a first aspect, to a method of manufacturing a hygienic brush head for cleaning articles, where the brush head comprises a plurality of flexible bristle filaments extending in a longitudinal direction grouped into flexible sweeping elements, being encapsulated in a moulded bristle carrier connected to a moulded brush head body, the method comprises: collecting the flexible bristle filaments in a grouping module creating at least one group of flexible sweeping elements; encapsulating the one end of the at least one group of flexible sweeping elements in a bristle carrier comprising a flange part that extends from the bristle carrier away from the flexible sweeping elements, positioning a plurality of the encapsulated groups of flexible sweeping elements in a mould, and performing a first brush head moulding of a brush head body around the plurality of the encapsulated groups of flexible sweeping elements; performing a second brush head moulding around the brush head body thereby creating a hygienic brush head. According to a second aspect, the present invention relates to a brush head. According to a third aspect, the present invention also concerns a broom comprising a brush head according to the invention. The brush head and broom may be made according to the method of the invention.

BACKGROUND

The present invention, in general, relates to a brush head or broom for sweeping dirt on a surface. The invention relates specifically to a brush head or broom with sweeping elements consisting of hair-like elements called bristles collected in groups also called tufts or sweeping elements.

In general, a broom is a tool used to clean up a surface by sweeping the dirt into a dustpan or dustbin. A conventional broom comprises a brush head, a broom stick and flexible sweeping elements positioned on the brush head. Usually, a sweeping element is a plurality of hair-like elements (bristles) and the broom stick is fixed at a particular position on top of the brush head, and the sweeping elements protrude from the bottom of the brush head. Generally, these sweeping elements are made of a flexible material.

FIG. 1 shows a conventional broom (prior art). The broom (100) comprises a broom stick (not shown), a brush head (102) and flexible sweeping elements (104). The broom stick is to be attached to a top end of the brush head (102) and the flexible sweeping elements (104) are positioned on the brush head (102). Also, the sweeping elements protrude from the bottom end of the brush head (102) in order to contact the surface during sweeping. The sweeping elements can be groups of flexible hair-like elements.

Prior art brooms generally contain groups of flexible hair-like elements that are collected in groups by way of gluing or threading a ring upon the hair-like elements. A brush head can then be moulded around the hair-like elements. The moulding process allows positioning of hair-like elements in groups in a mould, thereby eliminating the need to insert the hair-like elements into the holes or grooves of the brush head. However, a problem with prior art brooms, where the sweeping elements are groups of flexible hair-like elements, is that some of the hair-like elements in the individual sweeping elements loosen when the broom is used, especially center hairs in each individual sweeping element have the tendency to fall off the broom during use. In other words, during the moulding of a brush head, each bristle positioned on the outer boundary of the group is bonded all around with the moulding material, whereas bristles in the inner section of the group are loosely bound as compared with those on the periphery of the group. Therefore, the group keeps losing bristles from the inner section over a period of use.

Another problem with prior art brooms is that dirt can hide in cracks and holes around the hairs in the sweeping elements and in cracks and holes between individual mouldings. Thus, there is a need for a better brush head-making method. In particular there is a need for a better way of producing hygienic or even super hygienic brush heads.

US 2001/0013152 disclose a method of manufacturing a brush head, in particular for tooth brushed, by way of injection moulding. The bristle filaments are melted at one end before being encompassed by an easily flowing plastic material in a mould creating a bristle carrier. The material is only selected in view of the fact that a sufficient mould filling is obtained at the lowest possible temperatures and the lowest possible pressures possible. The bristle carriers seals the ducts of the second mould cavity so that high injection pressures can be used for the second moulding without the material being pressed out at the ducts.

The drawbacks of US 2001/0013152 is that there is a risk of cracks and holes between the two castings since the two materials will only integrate with each other to a limited extend. Therefore is the brush head in US 2001/0013152 not hygienic.

The object of the present invention is to provide brush heads and brooms comprising groups of flexible hair-like elements that solve the above mentioned hygiene problems.

SUMMARY OF INVENTION

This is obtained, in accordance with the first aspect of the present invention, by a method of manufacturing a hygienic brush head for cleaning articles, where the brush head comprises a plurality of flexible bristle filaments extending in a longitudinal direction grouped into flexible sweeping elements, being encapsulated in a moulded bristle carrier connected to a moulded brush head body, the method comprises:
  collecting the flexible bristle filaments in a grouping module creating at least one group of flexible sweeping elements,
  encapsulating the one end of the at least one group of flexible sweeping elements in a bristle carrier comprising a flange part that extends from the bristle carrier away from the flexible sweeping elements,
  positioning a plurality of the encapsulated groups of flexible sweeping elements in a mould, and performing a first brush head moulding of a brush head body around the plurality of the encapsulated groups of flexible sweeping elements,
  performing a second brush head moulding around the brush head body thereby creating a hygienic brush head.

The hygienic brush head can also be a broom. The difference between a brush head and a broom is that a broom may have a handle. The handle is preferably moulded as part of the second brush head moulding of the intermediate brush head body. However, the handle may also be attached to the hygienic brush head in any other suitable way.

Thereby, by encapsulating the one end of the at least one group of flexible sweeping elements in a bristle carrier comprising a flange part that extends from the bristle carrier away from the flexible sweeping elements, a better integration between the groups of hair-like elements and the brush head is obtained. This is advantages since this minimizes the tendency of formation of cracks and holes around the transition between the brush head and the groups of flexible hair-like elements, resulting in fewer hiding places for dirt and bacteria. Further, by moulding a moulded head part around the hair-like elements it is ensured that the individual hair does not loosen as easily, which of course is a disadvantage since this reduces the sweeping power of the brush head and further causes formation of cracks and holes around the hair-like elements where dirt and bacteria can hide.

In an embodiment the flange part extends from the bristle carrier away from the flexible sweeping elements in a perpendicular direction according to the longitudinal direction of the flexible bristle filaments.

The brush head has a bristle surface penetrated by the bristle filaments and the surface being formed by both the first component forming the encapsulated part and the second component forming the brush head body.

The bristle carrier formed squeezed the bristle filaments very tightly together creating a barrier making it hard for bacteria and dirt to enter in between the bristle filaments and into the interior of the bristle carrier.

The sweeping element is in one embodiment encapsulated by the bristle carrier only in the very lowest end of the bundle that has been melted. This means that the bristle filaments do not protrude deeply into the moulded bristle carrier. The reason for this is that the hiding places for dirt and bacteria between the individual hairs that are encapsulated are minimized when the end of the bristle filaments are positioned high up in the carrier.

According to one embodiment, the grouping module may include a set of prongs or clamps to hold the group of flexible bristle filaments. Further, according to another embodiment, there may be a plurality of the grouping modules.

Typically, the moulding forms used to mould the bristle carrier, performing the first brush head moulding of the brush head body and performing the second brush head moulding are made of steel since they are robust and durable and can easily resist the pressure applied under the injection mouldings.

In one embodiment the flange part is positioned at the transition between where the group of flexible sweeping element is non-encapsulated and where the group of flexible sweeping element is encapsulated.

The flange part (also called the lip or rim) is part of the moulded head part that encapsulates the collected group of hair-like elements. The flange part is moulded around the collected group of hair-like elements together with the moulded head part. The flange part can also be described as a collar that extent all the way around (360° C.) the bristle filaments and annularly or circumferential encompasses the bristles. The mould used to mould the moulded head part is shaped and dimensioned to obtain that the moulded head part comprises a thin rim around the sphere of the moulded head part. The precise embodiment of the flange part depends on the mould used for the moulding process. The flange is located at the other end of where the hair-like elements are totally encapsulated by the moulded head part, at the end where the visual transition between a central portion of the hair-like elements and the moulded head is placed. It is clear from the disclosed embodiments that the flange part of the moulded head part has a larger external diameter than the rest of the bristle carrier. It is important that the flange part is positioned at the transition between the moulded bristle carrier and the hair-like elements that the moulded head part shall encapsulate, since then when the first brush head moulding of a brush head body around the plurality of the encapsulated groups of flexible sweeping elements creating an intermediate brush head, these flange parts will flush with what will end up as the bristle surface after the brush head body has been moulded around a plurality of these moulded bristle carriers and has solidified.

In one embodiment the conditions under the first brush head moulding ensures that the flange part at least partially melts and consolidate with the brush head body. The melting temperature is preferably from 220-300 degrees Celsius, preferably from 240-280 degrees Celsius, preferably around 260 degrees Celsius. The injection pressure is preferably from 200-300 bar.

In addition to that a flange part extends from the bristle carrier away from the flexible sweeping elements, it is preferably that the flange part is thin and preferably also flexible. By incorporating this flexible thin flange, rim or collar at the top of the moulded head part, a smooth transition between the moulded head part and the brush head is ensured during the moulding process since the thin flange of the moulded head part at least partially melts in the process of moulding the brush head around the moulded head part due to the heat from the material being injection moulded when moulding the brush head body. This entails that the flange of the moulded bristle carrier melts and fuse together with the brush head body being moulded around the bristle carrier and thereby obtaining an efficient anchoring effect since the flange part works like a seal or gasket. If the flange part is omitted in the moulding process, the transition between the moulded bristle carrier and the brush head body when moulding the brush head body around a plurality of hair-like elements that are encapsulated in a moulded bristle carrier cannot be as smooth. This is due to the fact that during the moulding process the material making up the bristle carrier only melts to some degree, whereas if a thin rim is placed all around the edge of the moulded head part this will melt in greater extent. The thin rim is placed where the transition between the hair-like elements is non-encapsulated and where the moulded head part starts. Placing a thin rim at this place will entail that the thin rim will melt and integrate very well with the material making up the brush head body and the upper edge of the moulded bristle carrier will flush with what will end up as the bristle surface after the brush head body has been moulded around a plurality of these moulded bristle carriers and has solidified, resulting in a very smooth bristle surface. During the first brush head injection moulding when the thin rim melt, it will chemically bond and mechanically consolidate with the material from the brush head body embedding the bristle carrier and the rim so that a very strong integration between the two castings will happens. This can significantly reduce formation of cracks and holes in this transition between the moulded bristle carrier and the brush head body. Since the moulded head part encapsulates the groups of flexible hair-like elements, the tendency of formation of cracks and holes around the transition between the brush head and the hair-like elements is minimized resulting in fewer hiding places for dirt and bacteria. This makes the brush head and brooms of the present invention especially preferred for use in places where hygiene is at outmost importance The dimensions (thickness and width) of the rim or flange part are variable. Thickness is here being defined as being along the length of the flexible hair-like elements and width is here being defined as being perpendicular to the hair-like elements. In one embodiment the width is between 0-10 mm, preferably between 0.1-5 mm, even more preferably between 0.5-1.5 mm. In one embodiment the thickness is between 0-5 mm, preferably between 0.1-2 mm, even more preferably between 0.1-1 mm. It is important that the mould ensures that the flange part is located at the other end of where the hair-like elements are totally encapsulated by the moulded head part, positioned at the visual transition between the moulded head part and the hair-like elements that the moulded head part shall encapsulate and that the flange part is thin. The thin rim is placed where the transition between the hair-like elements is non-encapsulated and encapsulated. Placing a thin rim at this place will entail that the thin rim will melt and integrate very well with the material making up the brush head body.

The method where a brush head body is moulded around groups of encapsulated sweeping elements is implemented in two steps by first positioning a plurality of said groups of encapsulated sweeping elements in a mould and performing a first brush head moulding of a brush head body around said plurality of said groups of encapsulated flexible sweeping elements creating an intermediate brush head, afterwards is second brush head moulding around the brush head body performed, creating a hygienic brush head. The moulding technique used to perform the two is known to anyone skilled in the art of moulding. The hygienic brush head or broom will have a smooth and even surface and which might have a moulded handle as well. During the second brush head moulding it is of most importance that no edges are being created at the transitions between the two castings. In one embodiment the second brush head moulding is conducted only after the brush head body has cooled for a predetermined time.

In one embodiment that time is at least 1 minute, at least 2 minutes, at least 3 minutes, at least 4 minutes, at least 5 minutes, at least 6 minutes, at least 7 minutes, at least 8 minutes. In a preferred embodiment the brush head body has cooled for 4 minutes before performing the second brush head moulding.

Further, the upper front surface of several thin rims will contact the inner surface of the upper part of the mould creating a seal towards the inner surface of the upper part of the mould during the moulding process and seals the duct which entails that the material being injected when the first brush head moulding is initiated does not flow out through the holes/ducts intended for the groups of hair-like elements. If the flange part is left out, a small amount of material might be able to be pushed up between the mould and the groups of hair-like elements in the moulding process which is undesirable since this could potentially create cracks and holes in the transition between the moulded head part and the brush head.

It is found that the method results in a brush head with a surface that appears as one "continuous" and "closed" surface that does not collect dirt, particles, bacteria and alike or at least reduces or significantly reduces the collection and accumulation of such or equally important provides a brush head with a surface that is easily cleanable. Thus the method provides a hygienic or even super hygienic brush head.

Throughout the application the terms lip, flange, collar and rim are used interchangeably to describe the same feature of the invention.

In one embodiment the method further comprises melting one end of the at least one group of flexible sweeping elements using a melting module, creating a melted end. The melting is performed at a temperature and during a time period depending on the material of the bristle filaments. In an embodiment of the method the melting of one end of said group of hair-like elements is performed by heating an end surface of said group of hair-like elements for a predetermined period of time. In an embodiment of the method the melting of one end of said groups of hair-like elements is performed by a machine or an object, e.g. a metal block configured for applying a temperature greater than the melting temperature of the flexible hair-like elements to the flexible hair-like elements.

By melting and fusing the hair-like elements together in one end before moulding the bristle carrier around the groups of hair-like elements, it is secured that each specific hair-like element are interconnected in groups, securing that the hair-like elements in the individual sweeping elements do not loosen when the brush head is used. Especially it is secured that the non-peripheral (inner) flexible hair-like elements, which in prior art brooms have a tendency to fall out, do not fall off the brush head during use.

In one embodiment the method further comprises gliding the flexible sweeping elements positioned in the grouping module away from the melting module in a direction substantially perpendicularly to the longitudinal direction of the flexible bristle filaments. In one embodiment gliding the flexible sweeping elements positioned in the grouping module away from the melting module in a direction substantially perpendicularly to the longitudinal direction of the flexible bristle filaments happens after the melting is accomplished. The flexible sweeping elements positioned in the grouping module is glided away from the melting module after the melting is accomplished, this while the melting module is stationary being kept in position.

By gliding the flexible sweeping elements positioned in the grouping module away from the melting module in a direction substantially perpendicularly to the longitudinal direction of the flexible bristle filaments it is obtained that the melting module does not accidental pull out threads from the bristle filaments or pull up the whole sweeping element from the grouping module that they are positioned in when the melting is finished and the melting module is transferred back to its initial place, ready for a new cycle round. By gliding/turning the flexible sweeping elements relative to the melting module the filaments are fused together more thorough, since the flexible sweeping elements positioned in the grouping module are still in contact with the melting module during the gliding. The melting ensures that all the bristle filaments are melted without being over-melted ensuring a smooth surface of the end that has been melted. The result of the melting is that the finish of the surface of the end of the bundle that has been melted is smooth an even and that all the individual bristle filaments are fused together so that the bristle filaments in the individual sweeping elements do not loosen when the brush head is used.

In one embodiment the gliding of the flexible sweeping elements positioned in the grouping module away from the melting module in a direction substantially perpendicularly to the longitudinal direction of the flexible bristle filaments comprises gliding apart the flexible sweeping elements positioned in the grouping module and the melting module substantially perpendicularly to the longitudinal direction of the flexible bristle filaments.

In one embodiment when the flexible sweeping elements positioned in the grouping module are glided away from the melting module in a direction substantially perpendicularly to the longitudinal direction of the flexible bristle filaments and the melting is finished, the melting unit is lifted and moved away from the place of melting and is transferred back to its initial place, ready for a new cycle round.

In one embodiment the method further comprises establishing the position of the one end of the at least one group of flexible sweeping elements and when melting the one end with the melting module the melting module is adjusted according to the position. The position of the one end of the group of flexible sweeping elements is established before melting the one end. When the melting of the one end with the melting module is happening, the melting module is adjusted according to the position. By establishing the position of the one end that has to be melted the melting module can be adjusted according to this position. This can ensure that the finish of the surface of the end of the bundle that has been melted is smooth an even and that all the individual bristle filaments are fused together. The establishing of the position gives a measure of the height of the flexible sweeping element.

The grouping module may also be configured to carry the collected group of flexible bristle filaments, also called flexible sweeping elements, to the place of establishing the position of the one end, also called height measurement in the following. The height measurement of the flexible sweeping elements is performed since the height of the bristle filaments can vary. This height measure is then used to adjust the height of the melting module that applied heat to the end of the bundle of filaments. In practice the measurement is performed by stamping the bristle filaments hold by the grouping module against a plate so that the individual filaments flush with each other and then measure the height of the bundle giving a measure of the average height of the bristle filaments. The flexible sweeping element is hereafter moved to the melting module where the one end of the bundle is melted.

In one embodiment the melting module is adjusted to 0.01/10-5/10 mm, preferably 0.05/10-3/10 mm, more preferably about 1/10 mm less than the established position of the one end of the at least one group of flexible sweeping elements. It has been found that when the melting module is adjusted to 0.01/10-5/10 mm, preferably 0.05/10-3/10 mm, more preferably about 1/10 mm less than the established position of the one end of the at least one group of flexible sweeping elements a very smooth an even surface of the end that has been melted is obtained. The melting ensures that all the bristle filaments are melted without being over-melted. The result of the adjusting of the melting module is that the finish of the surface of the end of the bundle that has been melted is smooth an even and that all the individual bristle filaments are fused together so that the bristle filaments in the individual sweeping elements do not loosen when the brush head is used.

In one embodiment a fix point of the grouping module is used as a reference point to the established position of the one end of the at least one group of flexible sweeping elements, thus essentially providing a length, or a height that easily can be used to control to the melting.

The melting module is for each individual flexible sweeping elements adjusted in height-level according to the established position of the one end of the at least one group of flexible sweeping elements (the measured height of the individual flexible sweeping elements) so that all of the individual flexible sweeping element obtains consistent degree of melting. In a preferred embodiment the melting of the individual groups of flexible sweeping elements is performed by setting the height-level of the melting module to be 1/10 mm less than the established position of the one end of the at least one group of flexible sweeping elements (the measured height of the individual groups of flexible sweeping elements).

In one embodiment of the invention the bristle filaments grouped into flexible sweeping elements are made from polymers or any other suitable material with elastic properties, such as polystyrene (PS), polyethylene terephthalate (PET) or polybutylene terephthalate (PBT). This improves the flexibility of the sweeping elements, and thus improves the cleaning effect of the sweeping elements. In a preferred embodiment the the bristle filaments grouped into flexible sweeping elements are made from PBT.

In accordance with an embodiment of the invention the bristle carrier (head part) is made from any suitable material such as, but not limited to, plastics and polymers. In accordance with an embodiment of the invention, the bristle carrier is made from polypropylene (PP). In accordance with another embodiment of the invention, the bristle carrier is made from polyethylene terephthalate (PET). In accordance with another embodiment of the invention, the bristle carrier is preferably made from polybutylene terephthalate (PBT).

In accordance with an embodiment of the invention the hygienic brush head may be of a circular, square, rectangle or any other shape as desired by the manufacturer. Further, the brush head is made of any suitable material such as, but not limited to, plastics and polymers. Here the brush head refers to both the (intermediate) brush head body and the finished brush head after performing both the first and the second brush head mouldings. In accordance with an embodiment of the invention, the material used for the first brush head moulding and the second brush head moulding are polyethylene terephthalate (PET). In accordance with another embodiment of the invention, the material used for the first brush head moulding and the second brush head moulding are polybutylene terephthalate (PBT). In accordance with a preferred embodiment of the invention, the material used for the first brush head moulding and the second brush head moulding are polypropylene (PP). So both the first brush head moulding of the brush head body and the material used under the second brush head moulding are the same material, preferably PP.

In a preferred embodiment the bristle filaments grouped into flexible sweeping elements and the bristle carrier are made from polybutylene terephthalate (PBT). Further, in an even more preferred embodiment the bristle filaments grouped into flexible sweeping elements and the bristle carrier are made from polybutylene terephthalate (PBT) and the material used for the first brush head moulding and the second brush head moulding are polypropylene (PP).

In another embodiment the bristle filaments grouped into flexible sweeping elements, the bristle carrier and the material used for the first brush head moulding and the second brush head moulding are polybutylene terephthalate (PBT).

The present invention also comprises a hygienic brush head for cleaning articles comprising a plurality of flexible bristle filaments grouped into flexible sweeping elements, being encapsulated in a moulded bristle carrier connected to a moulded brush head body, where the bristle carrier comprising a flange part that extends from the bristle carrier away from the flexible sweeping elements.

In an embodiment the flange part extends from the bristle carrier away from the flexible sweeping elements in a perpendicular direction according to the longitudinal direction of the flexible bristle filaments.

The flange part (also called the lip or rim) is part of the moulded head part that encapsulates the collected group of hair-like elements. The flange part can also be described as a collar that extent all the way around (360° C.) the bristle filaments and annularly or circumferential encompasses the bristles. The flange is located at the other end of where the hair-like elements are totally encapsulated by the moulded head part, at the end where the visual transition between a central portion of the hair-like elements and the moulded head is placed. It is clear from the disclosed embodiments that the flange part of the moulded head part has a larger external diameter than the rest of the bristle carrier. In an embodiment the flange part is positioned at the transition between where the group of flexible sweeping element is non-encapsulated and where the group of flexible sweeping element is encapsulated.

In an embodiment the flange part is at least partially melted and consolidated together with the brush head body. The flange part is configured to secure tight connection between the bristle carrier and the brush head body by means of fusion between the bristle carrier and the brush head body as described above in connection with the disclosure of the method.

In an embodiment the bristle carrier is conical. This further entails the anchoring effect since when the bristle carrier are over moulded during the first brush head moulding and hardened creating the intermediate brush head the conical bristle carrier will be held firmly in position by the (intermediate) brush head body.

The present invention also comprises a broom comprising a brush head in accordance with the present invention.

The brush heads or brooms have bristle filaments that are encapsulated in a bristle carrier in one end and moulded in a brush head body creating an intermediate brush head which is embedded in a second brush head moulding. The groups of hair-like elements are preferably melted together in one end before being encapsulated in a moulded bristle carrier. The brush heads or brooms have a smooth integration between the encapsulated hair-like elements and the brush head. This minimizes the risk of losing broom hairs since each group of hair-like elements is encapsulated in a moulded head part and further, a brush head or broom made by the method of the present invention also minimizes the tendency of formation of cracks and holes around the hair-like elements and each hair, and especially between the two castings resulting in fewer hiding places for dirt and bacteria.

The brush head and the broom of the present invention, with these flexible, hair-like elements can be used to clean and sweep any kind of surfaces e.g. in houses, outdoor, in hospitals, in experimental laboratories and intensive care units. Since the brush head and the broom of the present invention have less tendency of formation of cracks and holes, resulting in fewer hiding places for dirt and bacteria, it is especially useful at places that have to maintain a high hygiene level. Such places could be, but are not limited to hospitals, experimental laboratories, intensive care units and food production units.

The upper front side of the flange is flush with the brush head. Thereby when looking at the brush head the transition between the flange and the brush head are invisible or almost invisible.

The brush heads and brooms that are produced by the method according to the present invention have been developed in line with the general principles of good hygienic design. These general principles maximise the ability of the brush heads and brooms themselves to be quickly, easily and effectively decontaminated and thus not become a source or vector for contamination.

The design of the brush heads and brooms according to the present invention all utilise food contact approved, non-absorbent, un-painted or coated, durable materials of construction, have smooth convex surfaces, thereby making them easier to clean and eliminating hollows where liquids and debris could accumulate.

All merging bodies, surfaces and edges of the brush heads and the brooms are designed with clean and smooth transitions and large edge rounding's to ensure both ease of cleaning and hygienic expression.

The difference between a brush head and a broom is that a broom can have a handle. If there is a handle this can be moulded as part of the second brush head moulding around the brush head body. But the handle can also be attached to the brush head separately.

The present brush head or broom according to the present invention is preferably manufactured by the method of the present invention.

BRIEF DESCRIPTION OF THE DRAWINGS

The above and other features and advantages of the present invention will become readily apparent to those skilled in the art by the following detailed description of exemplary embodiments thereof with reference to the attached drawings, in which:

FIG. 2 illustrates the step where a group of hair-like elements is encapsulated in a moulded head part comprising a flange part, and the resulting unit, FIGS. 3 a and b illustrate the step where a brush head is moulded around encapsulated groups of hair-like elements, FIGS. 4 a and b illustrate a broom made according to the present invention comprising a brush head according to the present invention.

DETAILED DESCRIPTION

Figure 1:
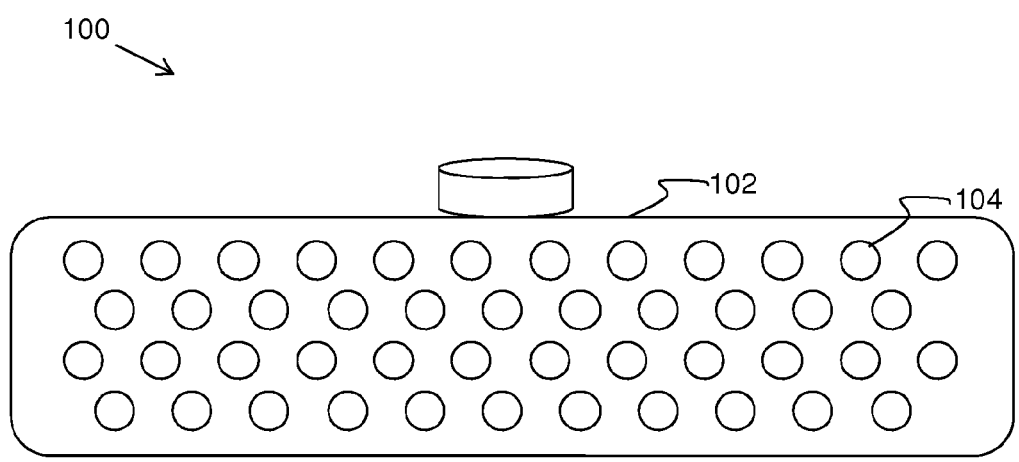
FIG. 1 shows a conventional broom (prior art)

The figures are schematic and simplified for clarity, and they merely show details which are essential to the understanding of the invention, while other details have been left out. Throughout, the same reference numerals are used for identical or corresponding parts. It should be noted that the terms bristle filaments and flexible hair-like elements have been used interchangeably in the patent application and that the terms flexible sweeping elements and bundles or groups of bristle filaments have been used interchangeably and that the terms head part and bristle carrier have been used interchangeably.

FIG. 1 illustrates a conventional broom (prior art). The broom (100) comprises a broom stick (not shown), a brush head (102) and flexible sweeping elements (104). The broom stick is to be attached to a top end of the brush head (102) and the flexible sweeping elements (104) are positioned on the brush head (102). Also, the sweeping elements protrude from the bottom end of the brush head (102) in order to contact the surface during sweeping. The sweeping elements can be groups of flexible hair-like elements.

FIG. 2 illustrates the step of the method where the bristle filaments or the hair-like elements (200) are collected in groups (202) and encapsulated in a moulded head part (208) comprising a flange part (222). The bristle filaments are collected from a feeding source, the source can accommodate multiple bristle filaments. The collection of the hair-like elements (200) can be performed manually, but more often the hair-like elements are collected in groups with the assistance of a machine here called a grouping module. The grouping module (not shown in the figure) can collect the flexible hair-like elements and hold them in a firm grip. The flexible hair-like elements, also called flexible sweeping elements can be melted in one end before being encapsulated. The grouping module may be further configured to carry the collected group of flexible hair-like elements, to the place of height measurement (not shown in the figure). The height measurement of the flexible sweeping elements is performed since the height of the bristle filaments can vary. This height measure is then used to adjust the height of the melting module that applies heat to the end of the bundle of filaments. In practice the measurement is performed by stamping the bristle filaments hold by the grouping module against a plate so that the individual filaments flush with each other and then measure the height of the bundle giving a measure of the average height of the bristle filaments. The flexible sweeping element can hereafter be moved to the melting module where the one end of the bundle is melted.

The melting module is configured to melt one end of the group of bristle filaments to form a fused end. The melting module may be a machine or an object, e.g. a metal block configured for applying a temperature higher than the melting temperature of the flexible bristle filaments to the flexible bristle filaments.

In a preferred embodiment the melting is performed by a melting module comprising a melting plate. The melting module is for each individual flexible sweeping elements adjusted in height-level according to the measured height of the individual flexible sweeping elements so that all of the individual flexible sweeping element obtains consistent degree of melting. In a preferred embodiment the melting of the individual groups of flexible sweeping elements is performed by setting the height-level of the melting module to be 1/10 mm less than the measured height of the individual groups of flexible sweeping elements. The melting is performed at a temperature and during a time period depending on the material of the bristle filaments. The flexible sweeping elements positioned in the grouping module is glided away from the melting module after the melting is accomplished, this while the melting module is stationary being kept in position. This entails the further advantage that the melting module does not accidental pull out threads from the bristle filaments or pull up the whole sweeping element from the grouping module that they are positioned in when the melting is finished and the melting module is transferred back to its initial place, ready for a new cycle round. The melting ensures that all the bristle filaments are melted without being overmelted ensuring a smooth surface of the end that has been melted. The result of the melting is that the finish of the surface of the end of the bundle that has been melted is smooth an even and that all the individual bristle filaments are fused together.

The height-level load applied by the melting module to the bundle, preferably set to be 1/10 mm less than the measured height of the individual groups of flexible sweeping elements, is the same for all the bundles. This is ensured since the bundle is first measured in heights followed by that that information is supplied to the melting module. The melting module then adjust the height-level load to apply to that specific bundle that is about to be melted by the melting module.

By the melting process described is obtained a flexible sweeping element of bristle filaments that has a smooth an even surface finish of the end of the bundle that has been fused together.

By melting and fusing the bristle filaments together in one end before moulding the brush head around the groups of bristle filaments, it is secured that each specific bristle filament are interconnected in groups, securing that the bristle filaments in the individual sweeping elements do not loosen when the brush head is used. Especially, by melting the bristle filaments together in one end before moulding the brush head around the bundle, it is secured that the center hairs, which in prior art brooms have a tendency to fall out, do not fall off the broom during use.

Figure 6:
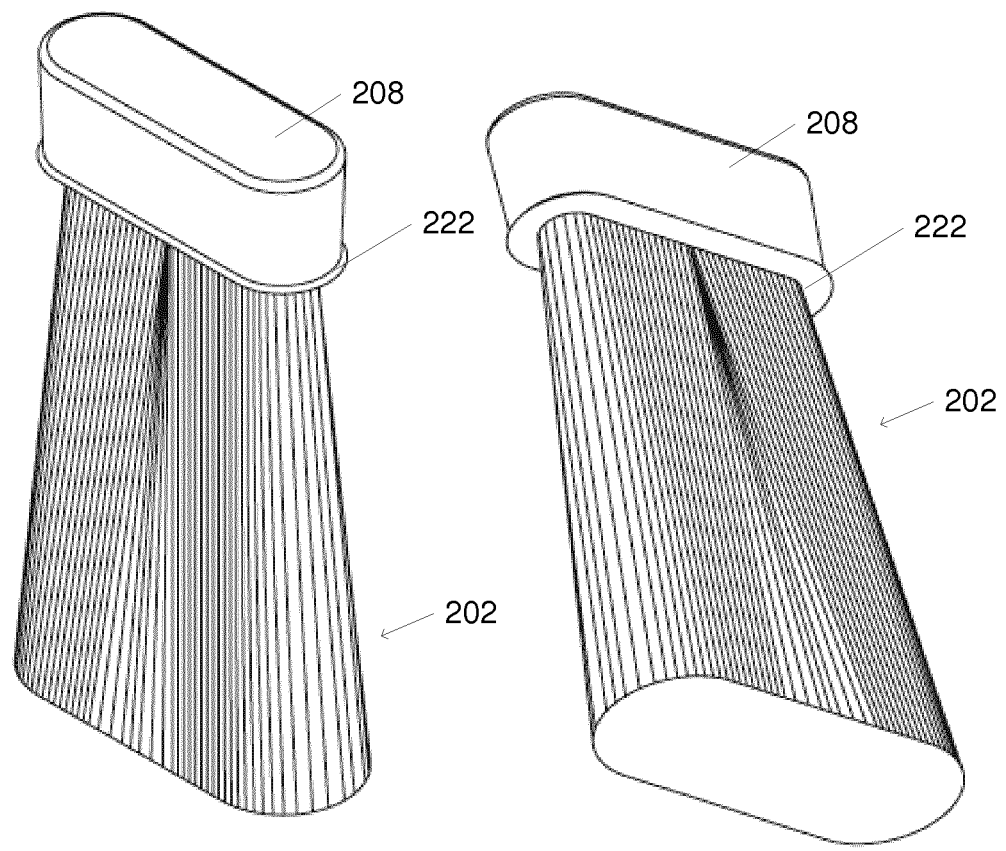
FIGS. 6 a, b, c, d and e shows a unit of encapsulated hair-like elements.
Figure 6:
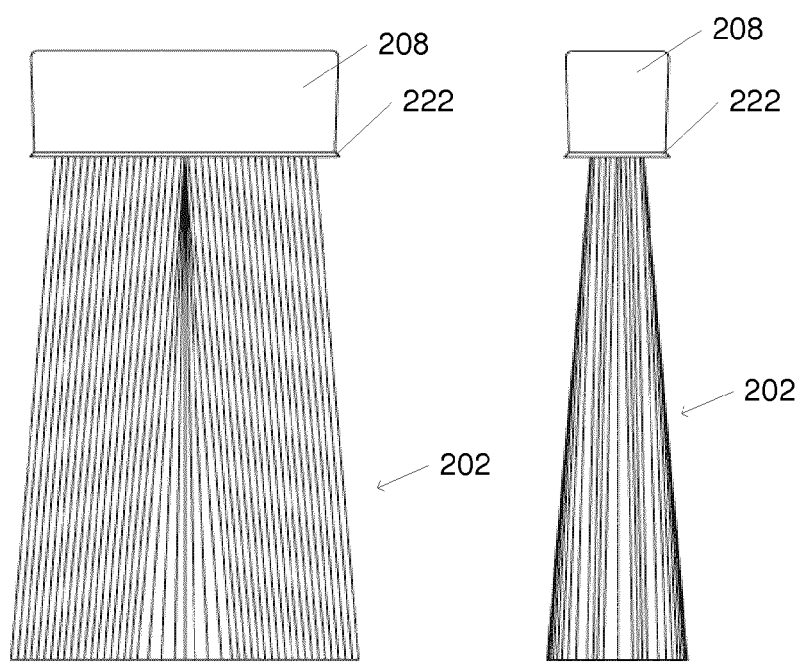
Figure 6:
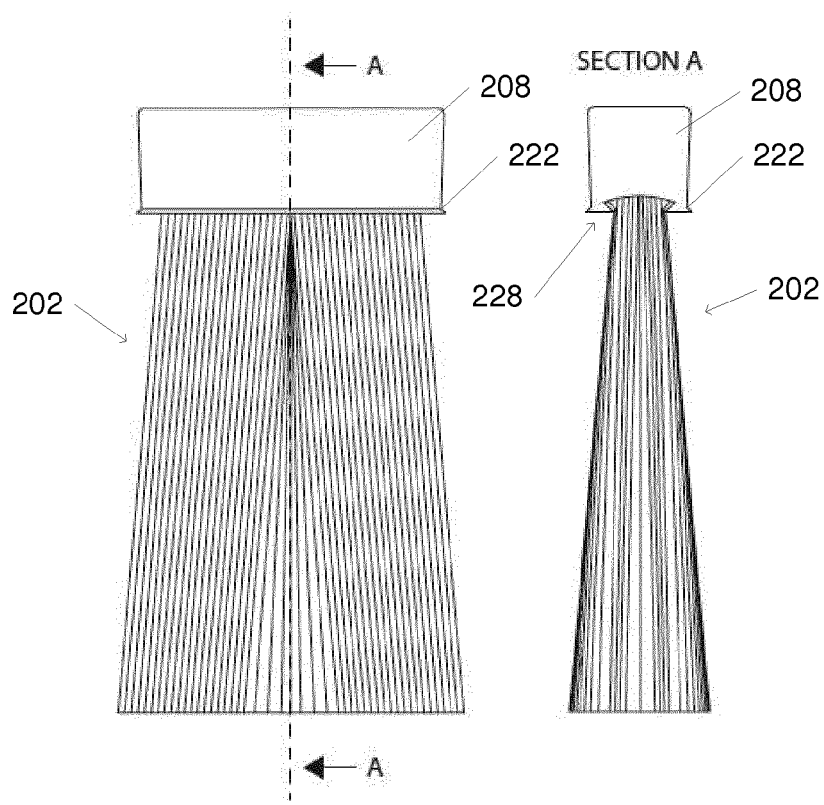
Figure 6:
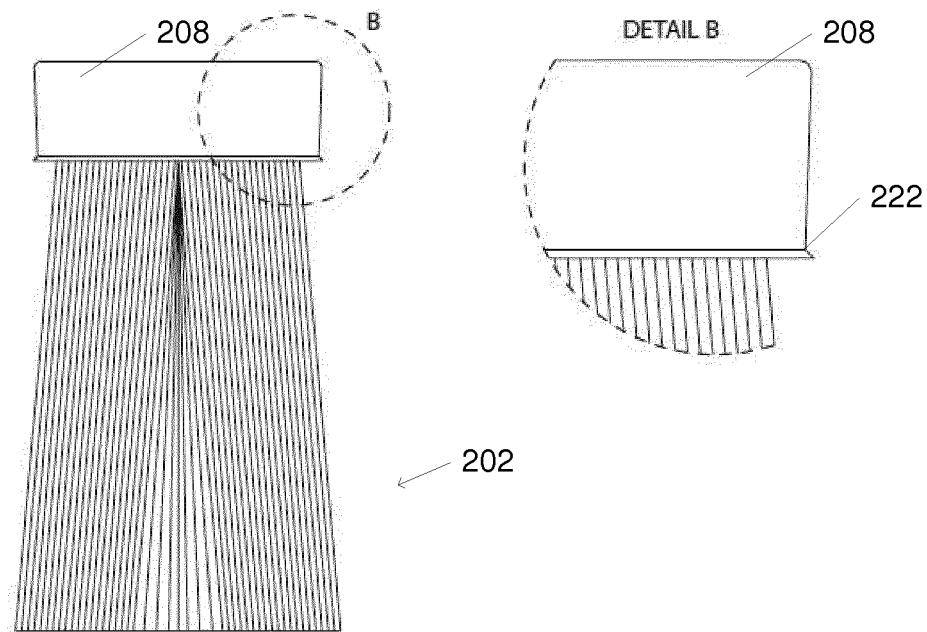
Figure 6:
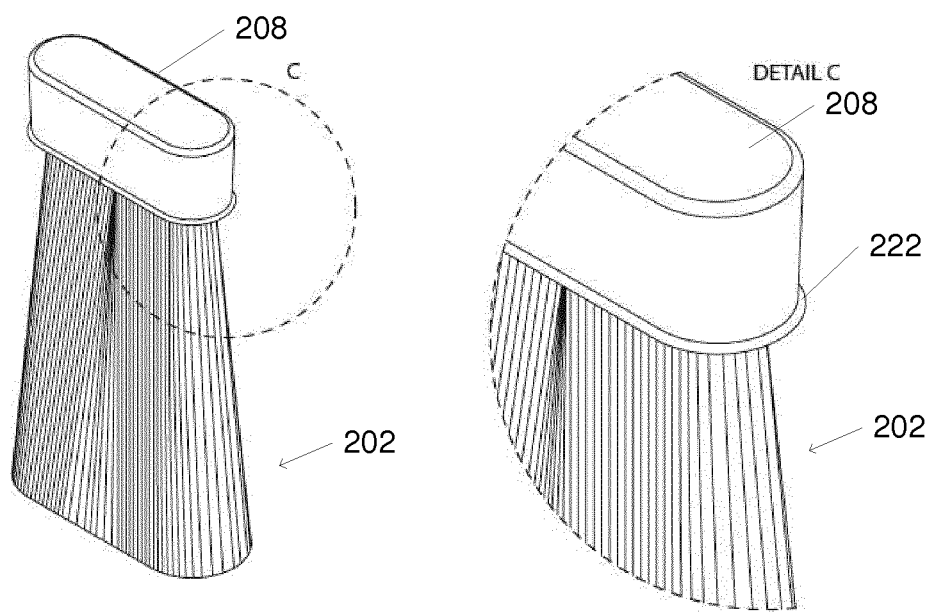

As shown in FIG. 6 c, another advantage obtained by incorporating the sweeping elements in a moulded carrier part is that the hair-like elements can be held together in a firm grip by the moulded material which reduces the risk of holes between the individual hair-like elements as compared to if the melted and fused group of hair-like elements (202) was not given a moulded carrier part. How close together the individual hair-like elements are positioned is determined by the mould used and the pressure applied by that specific mould to the bristle filaments. The bristle carrier formed squeezed the bristle filaments very tightly together creating a barrier making it hard for bacteria and dirt to enter in between the bristle filaments and into the interior of the bristle carrier.

The grouping module may be further configured to carry the collected group of flexible hair-like elements to the encapsulating head part moulding module for creating a moulded encapsulating part also called a bristle carrier and to the overall moulding module (not shown in the figure). The grouping module may hold the group of flexible hair-like elements while the encapsulating moulding module moulds the bristle carrier around the end of the group of flexible hair-like elements that may be fused in the one end. According to one of the embodiments, the grouping module may include a set of prongs or clamps to hold the group of flexible hair-like elements. Further, according to another embodiment, there may be a plurality of the grouping modules.

This step of moulding a moulded bristle carrier (208) around each group of hair-like elements (202), before a plurality of said groups of hair-like elements (202) are positioned in a mould, and said brush head (206) is moulded around said plurality of groups of hair-like elements (202) is advantageous, since this minimizes the risk of losing broom hairs (200) since each group of hair-like elements (202) is encapsulated in a moulded part (208) before a plurality of these encapsulated group of hair-like elements are positioned in a mould, and the brush head (206) is moulded around said plurality of groups of hair-like elements.

The individual hair-like elements (200) cannot as easily loosen from the group of which they are part since the hair-like elements are moulded in the head part (206), securing that the hair-like elements (200) in the individual sweeping elements do not loosen when the brush head is used. Another advantage obtained by incorporating the sweeping elements in a moulded carrier part is that the hair-like elements can be held together in a firm grip by the moulded material which reduces the risk of holes between the individual hair-like elements as compared to if the (melted and fused) group of hair-like elements was not given a moulded carrier part. How close together the individual hair-like elements are positioned is determined by the mould used and the pressure applied by that specific mould to the bristle filaments. The bristle carrier formed squeezed (228) the bristle filaments very tightly together creating a barrier making it hard for bacteria and dirt to enter in between the bristle filaments and into the interior of the bristle carrier.

The step is implemented by positioning a group of hair-like elements in a mould and moulding a moulded head part (208) around the group of hair-like elements. The moulding technique used to mould the moulded head part around a group of hair-like elements is known to anyone skilled in the art of moulding.

The flange part (also called the rim) is part of the moulded head part that encapsulates the collected group of hair-like elements. The flange part is moulded around the collected group of hair-like elements together with the moulded head part. The flange part can also be described as a collar that extent all the way around (360° C.) the bristle filaments and annularly or circumferential encompasses the bristles. The mould used to mould the moulded head part is shaped and dimensioned to obtain that the moulded head part comprises a thin rim (222) around the sphere of the moulded head part (208). The precise embodiment of the flange part depends on the mould used for the moulding process. The rim is located at the other end of where the hair-like elements are totally encapsulated by the moulded head part, at the end where the visual transition between a central portion of the hair-like elements and the moulded head is placed. It is clear from the disclosed embodiments that the flange part of the moulded head part has a larger external diameter than the rest of the bristle carrier. It is important that the flange part is positioned at the transition between the moulded bristle carrier and the hair-like elements that the moulded head part shall encapsulate, since then when the first brush head moulding of a brush head body (206) around the plurality of the encapsulated groups of flexible sweeping elements (202) creating a kind of intermediate brush head, these flange parts will flush with what will end up as the bristle surface after the brush head body has been moulded around a plurality of these moulded bristle carriers and has solidified.

It is also preferred that the flange part is thin. By incorporating this thin flange, rim or collar at the top of the moulded head part, a smooth transition between the moulded head part and the brush head is ensured during the moulding process since the thin flange of the moulded head part melts in the process of moulding the brush head around the moulded head part. This entails that the flange of the moulded head part melts together with the brush head body being moulded around the head part and thereby obtaining a efficient anchoring effect. If the flange part is omitted in the moulding process, the transition between the moulded head part and the brush head body when moulding the brush head body around a plurality of hair-like elements that are encapsulated in a moulded head part cannot be as smooth. This is due to the fact that during the moulding process the material making up the bristle carrier only melts to some degree, whereas if a thin rim is placed all around the edge of the moulded head part this will melt in greater extent. The thin rim is placed where the transition between the hair-like elements is non-encapsulated and where the moulded head part starts. Placing a thin rim at this place will entail that the thin rim will melt and integrate very well with the material making up the brush head body and the upper edge of the moulded bristle carrier will flush with what will end up as the bristle surface after the brush head body has been moulded around a plurality of these moulded bristle carriers and has solidified, resulting in a very smooth bristle surface. During the first brush head injection moulding when the thin rim melt, it will chemically bond and mechanically consolidate with the material from the brush head body embedding the bristle carrier and the rim so that a very strong integration between the two castings will happens. This can significantly reduce formation of cracks and holes in this transition between the moulded bristle carrier and the brush head body. Since the moulded head part encapsulates the groups of flexible hair-like elements, the tendency of formation of cracks and holes around the transition between the brush head and the hair-like elements is minimized resulting in fewer hiding places for dirt and bacteria.

The dimensions (thickness and width) of the rim or flange part (222) are variable. Thickness is here being defined as being along the length of the flexible hair-like elements (212) and width is here being defined as being perpendicular to the hair-like elements. In one embodiment the width is between 0-10 mm, preferably between 0.1-5 mm, even more preferably between 0.5-1.5 mm. In one embodiment the thickness is between 0-5 mm, preferably between 0.1-2 mm, even more preferably between 0.1-1 mm. It is important that the mould ensures that the flange part is located at the other end of where the hair-like elements are totally encapsulated by the moulded head part, positioned at the visual transition between the moulded head part and the hair-like elements that the moulded head part shall encapsulate and that the flange part is thin. The thin rim is placed where the transition between the hair-like elements is non-encapsulated and encapsulated. Placing a thin rim at this place will entail that the thin rim will melt and integrate very well with the material making up the brush head body.

Further, the upper front surface of several thin rims will contact the inner surface of the upper part of the mould creating a seal towards the inner surface of the upper part of the mould (214) during the moulding process and seals the duct which entails that the material being injected when the first brush head moulding is initiated does not flow out through the holes/ducts (226) intended for the groups of hair-like elements. If the flange part is left out, a small amount of material might be able to be pushed up between the mould and the groups of hair-like elements in the moulding process which is undesirable since this could potentially create cracks and holes in the transition between the moulded head part and the brush head.

The sweeping element is in one embodiment encapsulated by the bristle carrier only in the very lowest end of the bundle that has been melted as shown in FIG. 6c. This means that the bristle filaments do not protrude deeply into the moulded bristle carrier. The reason for this is that the hiding places for dirt and bacteria between the individual hairs that are encapsulated are minimized when the end of the bristle filaments are positioned high up in the carrier.

During the moulding step where the sweeping element is encapsulated by a bristle carrier both a mechanical binding and a chemical binding take place between the sweeping element and the material making up the bristle carrier.

After the step of moulding a moulded bristle carrier (208) comprising a flange part (222) around the end (204) of the group of flexible hair-like elements (202), the grouping module can carry the group of moulded flexible hair-like elements to the overall moulding module (comprising the first brush head moulding and the second brush head moulding) for moulding the brush head body around a number of bristle carriers with the flexible hair-like elements incorporated there into, as described in connection with FIG. 3. This flange or rim (222) is visible at the sphere of the moulded head part at the end where the transition between the hair-like elements and the moulded head are placed when looking isolated at the individual groups of encapsulated hair-like elements, whereas when the groups of encapsulated hair-like elements are placed in a mould and moulded together with a brush head body, the edge is almost invisible, if not completely invisible. This is due to the fact that the rim melts together with the material used to mould the brush head body around the individual groups of encapsulated hair-like elements. The integration of a rim at the moulded head part situated between the groups of hair-like elements and the brush head therefore ensures a smooth transition between the groups of hair-like elements and the brush head.

The bristle carrier is arranged in this mould so that the bristle surface of the bristle carrier where the bristle filaments penetrates from the bristle carrier is held flush with the inner surface in the mould. The bristle carrier contacts planarly the inner surface of the one half of the mould form (214) which comprises perforations/holes/ducts (226) that the bristle filaments protrude through. In the sphere just around the perforations/holes/ducts there are cavities in the mould form to accommodate/incorporate the flange part during the injection moulding. This cavity might be a milled groove. The surface of the bristle carrier with this flange part seals the ducts for accommodating the bristle filaments in the one half of the mould. The pressure applied on the bristle carriers positioned in the one half of the mould is preferably about 60 Ton but the pressure could be another value chosen by the skilled person. This further entails a sealing of the ducts. The pressure applied during the injection moulding is preferably about 300 bars but the pressure could be another value chosen by the skilled person.

Also during the moulding step where the encapsulated sweeping element is moulded into the brush head both a mechanical binding and a chemical binding take place between the bristle carrier and the material making up the brush head. In particular, there will be a strong mechanical binding and a chemical binding between the flange part of the bristle carrier and the brush head as described in more details below in connection with FIG. 3.

In accordance with an embodiment of the invention, the plurality of hair-like elements (bristle filaments) may be made from polymers or any other material with elastic properties. In accordance with an embodiment of the invention, the hair-like elements are made from polystyrene (PS). In accordance with an embodiment of the invention, the hair-like elements are made from polyethylene terephthalate (PET). In accordance with an embodiment of the invention, hair-like elements are made from polybutylene terephthalate (PBT). The number of individual hair-like elements (200) in each group (202) may vary dependent on the shape, thickness and material of the individual hair-like elements and on the use of the brush head. The overall shape of the group of individual hair-like elements can also vary greatly depending on the use of the brush head. The shape can be round, oval, oblong, square, rectangular or any other shape as desired.

In one embodiment the bristle filaments is PBT and the brush head body is PP. In one embodiment both the bristle filaments and the bristle carrier material is PBT. In one embodiment both the bristle filaments and the bristle carrier material is PBT and the brush head body is PP.

In one embodiment both the bristle filaments and the brush head body is PBT. In one embodiment both the bristle filaments and the bristle carrier material is PBT. In one embodiment the bristle filaments, the bristle carrier material and the brush head body is PBT.

There will be a mechanical binding and a chemical binding between the materials used. Both when the same material is used, e.g. when both the bristle filaments and the brush head body is PBT but also when the bristle carrier material is PBT and the brush head body is PP.

FIGS. 3 a and b illustrate the step of the method (overall moulding module) where a brush head body (206) is moulded around groups of hair-like elements (202) that have been encapsulated in one end (204) by a bristle carrier. This is implemented in two steps by first positioning a plurality of said groups of sweeping elements (202) in a mould (214), and performing a first brush head moulding of a brush head body (206) around said plurality of said groups of flexible sweeping elements (202) creating a kind of intermediate brush head, afterwards is second brush head moulding (220) of the brush head body (206) performed, creating a hygienic brush head (210).

The groups of hair-like elements (202) can be transferred to the overall moulding module and be held by the grouping module. The moulding technique used to mould the brush head around groups of hair-like elements is known to anyone skilled in the art of moulding. The hygienic brush head or broom will have a smooth and even surface and which might have a moulded handle as well. During the second brush head moulding it is of most importance that no edges are being created at the transitions between the two castings. In one embodiment the second brush head moulding is conducted only after the intermediate brush head body has cooled for a predetermined time. In one embodiment that time is at least 1 minute, at least 2 minutes, at least 3 minutes, at least 4 minutes, at least 5 minutes, at least 6 minutes, at least 7 minutes, at least 8 minutes. In a preferred embodiment the intermediate brush head body has cooled for 4 minutes before performing the second brush head moulding.

The finished brush head or broom can any kind of shape and a handle or no handle depending on the use of the finished brush.

The number of groups of hair-like elements (sweeping elements) (202) to be moulded in the brush head (206) can vary greatly dependent on the use of the brush head. The number of groups of hair-like elements also depends on the number of individual hair-like elements in each group and may vary dependent on the shape, thickness and material of the individual hair-like elements and on the use of the brush head. The overall shape of the group of individual hair-like elements (202) can also vary greatly depending on the use of the brush head. The shape can be round, oval, oblong, square, rectangular or any other shape as desired. The pattern in which the plurality of flexible sweeping elements are oriented according to one another and moulded in the brush head (206) may be of any type of pattern and is not limited to the patterns as shown in the figures.

By incorporating this thin flange or rim (222) at the top of the moulded head part (208), a smooth and plane transition between the moulded head part (208) and the brush head body (206) is ensured during the moulding process, since the thin flange of the moulded head part melts in the process of moulding the brush head around the moulded head part. This entails that the flange of the moulded head part melts totally together with the brush head body being moulded around the head part. If the flange part is omitted in the moulding process, the transition between the moulded head part and the brush head when moulding the brush head around a plurality of hair-like elements that are encapsulated in a moulded head part cannot be as smooth. This is due to the fact that during the moulding process the material making up the moulded head part only melts to some degree, whereas a thin rim placed all around the edge of the moulded head part will melt when put in contact with the fluid material that is moulded around the moulded head parts, simply because of the thickness of the structure of the rim. The thin rim is placed where the transition between the hair-like elements is non-encapsulated and where the moulded head part starts as shown in the figures. Placing a thin rim at this place will entail that the thin rim will melt and integrate very well with the material making up the brush head. This can significantly reduce formation of cracks and holes in this transition between the moulded head part and the brush head. Since the moulded head part encapsulates the groups of flexible hair-like elements, the tendency of formation of cracks and holes around the transition between the brush head and the hair-like elements is minimized resulting in fewer hiding places for dirt and bacteria. Further, as shown in FIG. 3b, the thin rim also creates a seal (224) towards the upper part of the mould (214) which entails that the material making up the brush head does not flow out through the holes for the groups of hair-like elements in the mould when the moulding process is initiated. If the flange part is left out, a small amount of material will be able to be pushed up between the mould and the groups of hair-like elements in the moulding process which is undesirable since this could potentially create cracks and holes in the transition between the moulded head part and the brush head.

Figure 4A:
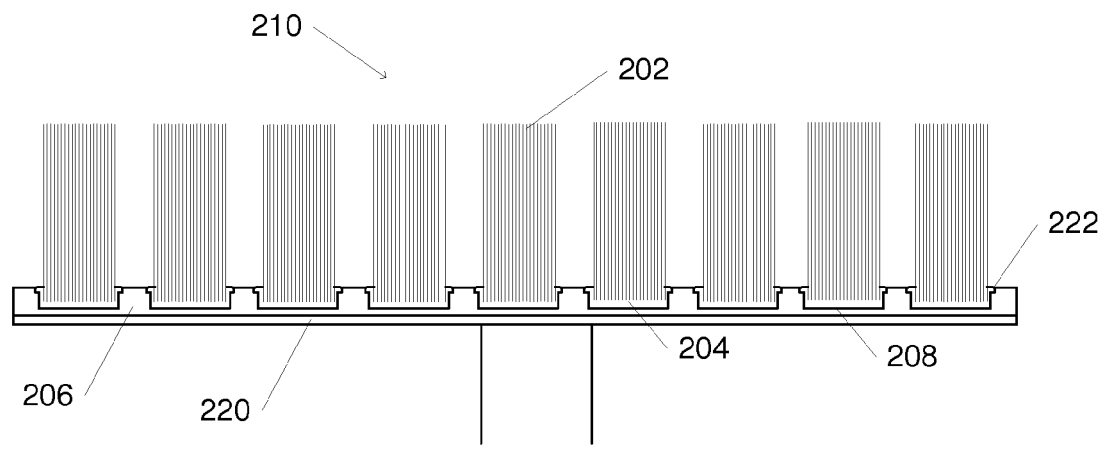
Figure 4B:
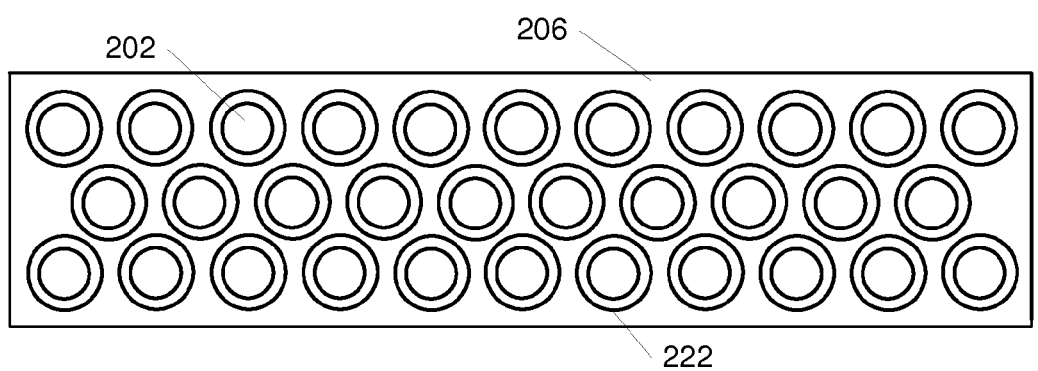

FIGS. 4 *a* and *b* illustrate a hygienic brush head (210) or a broom (210) comprising a brush head according to the present invention. The brush head (210) or a broom (210) comprising a brush head may be made according to the present manufacturing method. In the broom in this figure the groups of hair-like elements (202) are encapsulated in a bristle carrier (208) in one end (204) and moulded in a brush head body (206) which is embedded in a second brush head moulding (220). The groups of hair-like elements (202) are preferably melted together in one end (204) before being encapsulated in a moulded bristle carrier. A broom (210) like the one in the figure has a smooth integration between the encapsulated hair-like elements and the brush head. In this figure the transition is visible for demonstrative purpose but in real life the transition is almost if not completely invisible.

The brush head and the broom made by the method of the present invention, with these flexible, hair-like elements can be used to clean and sweep any kind of surfaces e.g. in houses, outdoor, in hospitals, in experimental laboratories and intensive care units. Since the brush head and the broom made by the method of the present invention have less tendency of formation of cracks and holes, resulting in fewer hiding places for dirt and bacteria, it is especially useful at places that have to maintain a high hygiene level. Such places could be, but are not limited to hospitals, experimental laboratories, intensive care units and food production units.

The brush heads and brooms that are produced by the method according to the present invention have been developed in line with the general principles of good hygienic design. These general principles maximise the ability of the brush heads and brooms themselves to be quickly, easily and effectively decontaminated and thus not become a source or vector for contamination.

The design of the brush heads and brooms according to the present invention all utilise food contact approved, non-absorbent, un-painted or coated, durable materials of construction, have smooth convex surfaces, thereby making them easier to clean and eliminating hollows where liquids and debris could accumulate.

All merging bodies, surfaces and edges of the brush heads and the brooms are designed with clean and smooth transitions and large edge rounding's to ensure both ease of cleaning and hygienic expression.

Figure 5:
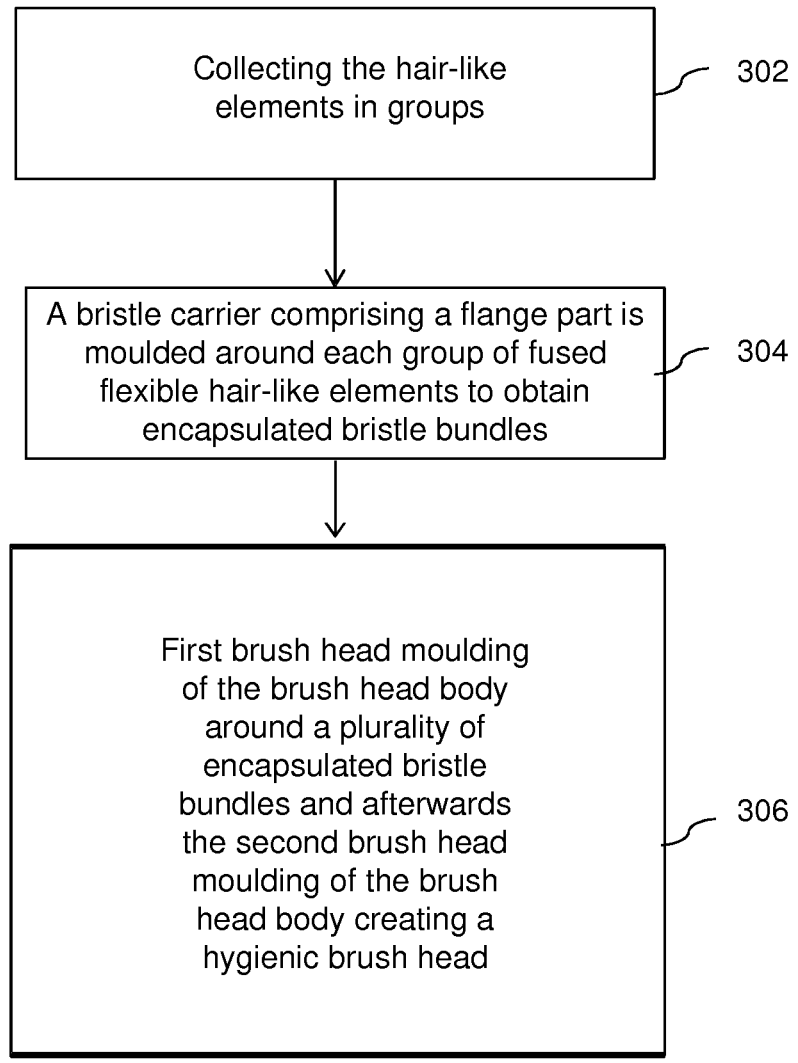
FIG. 5 illustrates a flow chart describing the steps for making a brush head.

FIG. 5 illustrates a flow chart describing the steps of making a brush head, in accordance with an embodiment of the present invention. At 302, a plurality of flexible hair-like elements is collected in groups from the source. At 304, one end of each group of the flexible hair-like elements is encapsulated by moulding a moulded bristle carrier comprising a flange part around the flexible hair-like elements to obtain a group of unified flexible hair-like elements. Preferably, the height of the bundles of hair-like elements is measured and the one end of each group of flexible hair-like elements is melted to obtain a group of fused flexible hair-like elements before encapsulating the flexible hair-like elements. Thereafter, at 306, a plurality of said encapsulated bristle bundles is positioned in a mould, followed by the first brush head moulding of the brush head body around the plurality of said encapsulated bristle bundles and afterwards the second brush head moulding of the brush head body creating a hygienic brush head.

FIGS. 6 *a, b, c, d* and *e* shows different angles of the unit of encapsulated hair-like elements that is shown more schematically in FIG. 2.

As shown in FIG. 6 *c*, the hair-like elements (202) can be held together in a firm grip by the moulded material making up the bristle carrier (208) which reduces the risk of holes between the individual hair-like elements as compared to if the (melted) and fused group of hair-like elements (202) was not given a moulded carrier part. How close together the individual hair-like elements are positioned is determined by the mould used and the pressure applied by that specific mould to the bristle filaments. The bristle carrier formed squeezed (arrow 228) the bristle filaments very tightly together creating a barrier making it hard for bacteria and dirt to enter in between the bristle filaments and into the interior of the bristle carrier.

The sweeping element is in one embodiment encapsulated by the bristle carrier only in the very lowest end of the bundle that has been melted as shown in FIG. 6*c*. This means that the bristle filaments do not protrude deeply into the moulded bristle carrier. The reason for this is that the hiding places for dirt and bacteria between the individual hairs that are encapsulated are minimized when the end of the bristle filaments are positioned high up in the carrier.

The moulded head part can be conical (see e.g. FIG. 5 *a-e*) which further entails the anchoring effect since when the bristle carrier are over moulded during the first brush head moulding and hardened creating the intermediate brush head the conical bristle carrier will be held firmly in position by the intermediate brush head.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

REFERENCE LIST flexible bristle filaments (200)
flexible sweeping elements/groups of bristle filaments (202)
melted end (204)
first brush head moulding of a brush head body (206)
bristle carrier/moulded encapsulating part (208)
brush head/broom (210)
longitudinal direction (212)
mould (214)
the position of the one end (216)
second brush head moulding (220)
flange part (222)
seal (224)
duct of the moulding form (226)
fix point of the grouping module (not shown in the figure)
grouping module (not shown in the figure)
melting module (not shown in the figure)

The invention claimed is:

1. A method of manufacturing a hygienic brush head for cleaning articles, where the brush head comprises a plurality of flexible bristle filaments extending in a longitudinal direction grouped into flexible sweeping elements, being encapsulated in a moulded bristle carrier connected to a moulded brush head body, the method comprises:

collecting the flexible bristle filaments in a grouping module creating at least one group of flexible sweeping elements, encapsulating one end of the at least one group of flexible sweeping elements in a bristle carrier comprising a bristle carrier body and a flange part that extends from the bristle carrier body away from the at least one group of flexible sweeping elements, the flange part having a larger external diameter than the bristle carrier body, positioning a plurality of the encapsulated groups of flexible sweeping elements in a mould, and performing a first brush head moulding of a brush head body around the plurality of the encapsulated groups of flexible sweeping elements, and performing a second brush head moulding around the brush head body thereby creating a hygienic brush head.

2. The method according to claim 1, where the flange part is positioned at a transition between where the at least one group of flexible sweeping elements is non-encapsulated and where the at least one group of flexible sweeping elements is encapsulated.

3. The method according to claim 1, where conditions under the first brush head moulding ensures that the flange part at least partially melts and consolidates with the brush head body.

4. The method according to claim 1, further comprising:
melting the one end of the at least one group of flexible sweeping elements using a melting module, creating a melted end.

5. The method according to claim 4 further comprising:
gliding the flexible sweeping elements positioned in the grouping module away from the melting module in a direction substantially perpendicularly to the longitudinal direction of the flexible bristle filaments.

6. The method according to claim 4 further comprising:
establishing a position of the one end of the at least one group of flexible sweeping elements and when melting the one end with the melting module, the melting module is adjusted according to the position.

7. The method according to claim 6, where a fix point of the grouping module is used in establishing the position of the one end of the at least one group of flexible sweeping elements.

8. The method according to claim 6, where the melting module is adjusted to 0.01/10-5/10 mm less than the established position of the one end of the at least one group of flexible sweeping elements.

9. The method according to claim 6, where the melting module is adjusted to 0.05/10-3/10 mm less than the established position of the one end of the at least one group of flexible sweeping elements.

10. The method according to claim 6, where the melting module is adjusted to about 1/10 mm less than the established position of the one end of the at least one group of flexible sweeping elements.

11. The method according to claim 1, wherein the bristle filaments are made from polybutylene terephthalate (PBT).

12. The method according to claim 1, wherein materials used for the first brush head moulding and the second brush head moulding comprise polypropylene (PP).

13. The method according to claim 1, wherein the bristle carrier is made from polybutylene terephthalate (PBT).

14. A hygienic brush head for cleaning articles, the hygenic brush head comprising a plurality of flexible bristle filaments, a moulded bristle carrier and a moulded brush head body, where the plurality of bristle filaments is grouped into flexible sweeping elements, being encapsulated in the moulded bristle carrier, where the moulded bristle carrier is moulded together with the moulded brush head body, and where the moulded bristle carrier comprises a bristle carrier body and a flange part that extends from the bristle carrier body away from the flexible sweeping elements, the flange part having a larger external diameter that the bristle carrier body.

15. The hygienic brush head according to claim 14, where the flange part extends from the bristle carrier body away from the flexible sweeping elements in a perpendicular direction according to a longitudinal direction of the flexible bristle filaments.

16. The hygienic brush head according to claim 14, where the flange part is at least partially melted and consolidated together with the brush head body.

17. The hygienic brush head according to claim 14, where the bristle carrier is conical.

18. A broom comprising a brush head in accordance with claim 14.

* * * * *